US006859324B2

(12) United States Patent
Meyers et al.

(10) Patent No.: US 6,859,324 B2
(45) Date of Patent: Feb. 22, 2005

(54) OPTICAL DEMULTIPLEXER/MULTIPLEXER ARCHITECTURE

(75) Inventors: Mark Meyers, Allentown, PA (US); David T. Neilson, Old Bridge, NJ (US); Stuart T. Stanton, Bridgewater, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/207,788

(22) Filed: Jul. 31, 2002

(65) Prior Publication Data

US 2004/0021952 A1 Feb. 5, 2004

(51) Int. Cl.[7] .................. G02B 27/10; G02B 13/08; G02B 6/28
(52) U.S. Cl. .................. 359/618; 359/668; 385/24
(58) Field of Search .................. 359/347, 349, 359/558, 668, 669, 618–620; 385/24; 398/42, 43, 79, 100, 106

(56) References Cited

U.S. PATENT DOCUMENTS

| | | | |
|---|---|---|---|
| 4,206,965 A * | 6/1980 | McGrew ...................... 359/629 |
| 5,557,475 A * | 9/1996 | Nightingale et al. ........ 359/349 |
| 5,628,917 A | 5/1997 | MacDonald et al. | |
| 5,933,270 A | 8/1999 | Toyohara | |
| 5,943,158 A | 8/1999 | Ford et al. | |
| 6,097,859 A | 8/2000 | Solgaard et al. | |
| 6,148,124 A | 11/2000 | Aksyuk et al. | |
| 6,163,643 A | 12/2000 | Bergmann et al. | |
| 6,356,689 B1 | 3/2002 | Greywall | |
| 6,381,052 B1 * | 4/2002 | Delisle et al. ................. 398/79 |
| 2002/0131691 A1 * | 9/2002 | Garrett et al. ................. 385/24 |
| 2002/0176135 A1 * | 11/2002 | Boord et al. ................. 359/130 |
| 2003/0021525 A1 * | 1/2003 | Turpin et al. ................. 385/24 |
| 2003/0128917 A1 * | 7/2003 | Turpin et al. ................. 385/24 |
| 2004/0033010 A1 * | 2/2004 | McGuire ...................... 385/16 |

* cited by examiner

*Primary Examiner*—Georgia Epps
*Assistant Examiner*—Alicia M Harrington

(57) ABSTRACT

The optical demuxplixer/multiplexer architecture includes an anamorphic optical system that decouples first characteristics of a beam passing through the anamorphic optical system from at least second characteristics of the beam.

14 Claims, 6 Drawing Sheets

OPTICAL DEMULTIPLEXER/MULTIPLEXER ARCHITECTURE

BACKGROUND OF THE INVENTION

1. Field of the Invention

The present invention relates to spectrally selective optical systems; and more particularly, spectrally-selective optical systems employing 1-dimensional dispersive elements (such as a grating).

2. Description of Related Art

Fiber optic networks employing wavelength-division multiplexing (WDM) require various devices capable of changing fiber mode characteristics, or the data encoded on those modes, in a distinct way for each wavelength "channel" co-propagating on that mode. These changes might include creating loss in a channel, re-routing channels from a first fiber to other fibers, or other treatments such as dispersion correction, detection and diagnostics. Generally, these functions require separation of co-propagating channels (demultiplexing or "demux") and recombination of those channels (multiplexing or "mux") after wavelength-specific conditioning is done.

Coupling the fiber mode into free-space allows access to these channels for treatment by "bulk" elements like lenses and gratings, and wavelength-specific treatment of beams using devices such as MEMS tilt mirrors or interferometers, or alternate devices like liquid crystal modulators. In many cases, such as in the use of a grating, the channel wavelengths are dispersed in a single direction such that the position (or angle) of the beams containing all wavelengths lie nominally in a common plane. This is the property of a 1-dimensional (1-D) dispersing element such as a regular parallel-line grating. In these cases, an array of devices that act on the individual wavelengths would be aligned to the array of beams. An example of this is shown in FIG. 1, where light from optical fiber(s) 10 passes through a condenser lens 12 and is separated into beams of particular wavelengths by a grating 14. The separated beams pass through the condenser lens 12 and are incident on an active linear device 16. The separated beams reflected back through the condenser lens 12 are rejoined by the grating 14 and re-enter the fiber(s) 10 after passing through the condenser lens 12.

It is common to define the axis of an optical system as "z" and imagine beams or rays progressing reasonably parallel to it such that this axis defines the sequence of changes to the beam as elements are traversed. For the system in FIG. 1, the z axis proceeds left to right in the page and is centered on the rotationally symmetric condenser lens 12. For systems not having a 1-D dispersive element like the grating, the remaining x and y axis definitions may be arbitrary, especially those systems described as "morphic". These are generally systems that use substantially spherical or rotationally symmetric surface elements and preserve the basic shape of the beam. For a single wavelength in FIG. 1, the round fiber mode is imaged as a round mode onto the active device 16, and then re-imaged back to itself as a round mode. The cross-sectional footprint of light at the grating location is round even though the grating tilt may project this footprint into an ellipse. For one wavelength and appropriate grating tilt, the effective rotational symmetry of the system in FIG. 1 is preserved.

When the wavelengths of interest are considered, the grating 14 or other 1-D dispersive element breaks the rotational symmetry of the system and defines the distinct non-dispersive (x) and dispersive (y) axes. The spots formed on the active device 16 are arrayed along the y axis according to wavelength. In addition, the spectral resolution of the system—the ability to distinguish spots of different wavelength and separately act on them—is improved if the spot sizes are small because two separable spots can then correspond to nearer wavelengths. This spot size is determined primarily by the convergence angle of the beam approaching that spot, or equivalently the optics numerical aperture (NA), if the system is diffraction limited as needed for efficient fiber coupling. These distinct co-existing system and axis definitions are shown in FIG. 2.

As FIG. 2 indicates, the y-z system must have a large enough NA to provide for adequate convergence angle for the wavelengths of interest, plus a wide enough well-corrected field for the active device that interacts with the dispersed spots. This combined large NA and field size requirement over a substantial wavelength range leads to complex optical designs employing adequate aberration correction and telecentricity. This requirement can lead to cost or optical loss disadvantages. It may be desirable to avoid enlarging the NA or field size requirements as functional or performance enhancements are considered.

SUMMARY OF THE INVENTION

A spectrally selective optical system according to the present invention uses anamorphic optical elements that distinguish element characteristics in the x and y directions. The inventors have recognized that the resolution dependence on numerical aperture (NA) is only related to the convergence angle in the y-z plane and hence the spot size along the y-axis. The x-z system has no bearing on resolution. The inventors have further recognized that there is also minimal constraint on the spot size which would be enlarged as the NA is reduced, since the active element is not arrayed along the x-axis. Recognizing this, it was further appreciated that the available angular and field ranges of the optical system may be underused by beams on a single or small set of possible routes, hence allowing more routing options (or "larger port count") in the same system. The narrow footprint of a beam in the x-z system is free to be manipulated in angle and position over ranges many times the angular and spatial width that the beam occupies, without the need for enlarging the system's field or NA.

Accordingly, the inventors have recognized that the optical system of FIG. 1 can be changed entirely with embedded anamorphic optics, or simply enhanced by placing specific anamorphic elements inside or outside the module boundaries. Cylindrical or prismatic elements or element arrays may be aligned to the arrayed active device. Alternately, cylindrical or prismatic or other arbitrary (e.g. diffractive) beam manipulation elements can be integrated in the front end of the system such that rays emerge from a modified image of an original fiber rather than directly from that fiber. The anamorphic manipulation of beams usually begins and ends with round spots associated with non-polarization-preserving fibers widely used in networks. However, the beam shape is generally not round at selected planes of important interactions.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EMBODIMENTS

Figure 1:
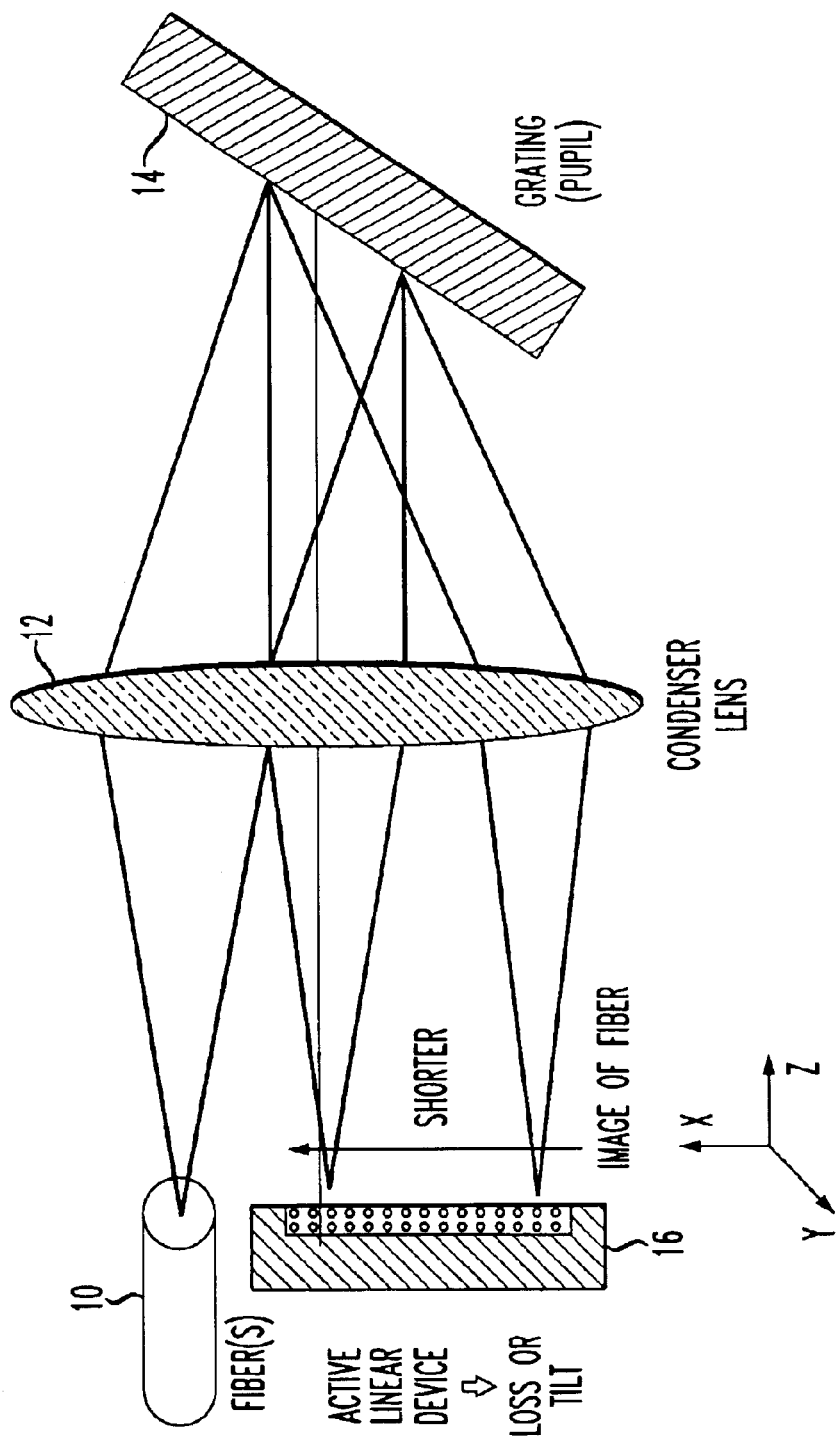
FIG. 1 illustrates the architecture of well-known wavelength division demultiplexing and multiplexing (demux/mux) systems including an active device.
Figure 2:
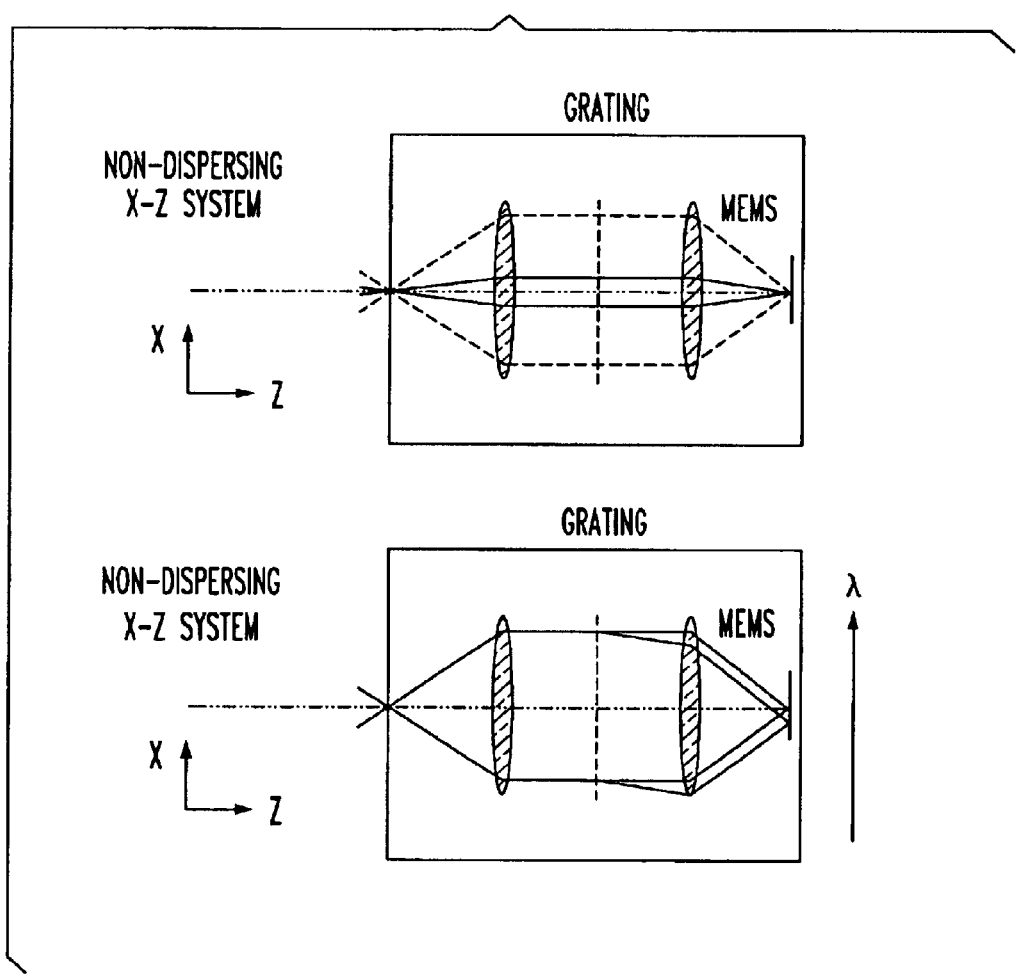
FIG. 2 illustrates the distinct co-existing system and axis definitions of the architecture shown in FIG. 1.

The optical mux/demux system shown in FIG. 1 modified or changed according to the broad inventive concept of the present invention is usable as a module for several products that have common spectral separation requirements (e.g. 100 GHz channel separation). Example products with distinct functions that could utilize this module are:

Channelized gain equalizer in analog mode or on/off (blocker) mode.

Non-channelized (continuous) gain equalizer.

Add-drop multiplexer.

Wavelength-selective router with multiple ports, such as a general switch or an interleaver.

Wavelength-selective conditioners of other kinds such as dispersion correction or data detection and manipulation.

These functions are possible by putting the appropriate arrayed active device at the dispersed spot array shown in FIG. 1. Also, an existing function may be enhanced for efficiency by use of polarization diversity to maximize grating efficiency, or simply avoiding the need for fiber circulators for sharing an input and output fiber port. In these cases, anamorphic optics according to the present invention as described in detail below benefit the system because two original polarization states or distinct input/output ports are separated in angular or spatial terms for propagating in the demux/mux system, hence effectively packing more beams in the same system.

The following detailed descriptions and associated drawings illustrate the versatility of the broad inventive concept through some specific examples. The examples given are based on the demux/mux optical module with a 1-D grating and active device positioned as shown in FIG. 1, but the present invention should not be construed as limited to this optical system.

Figure 3:
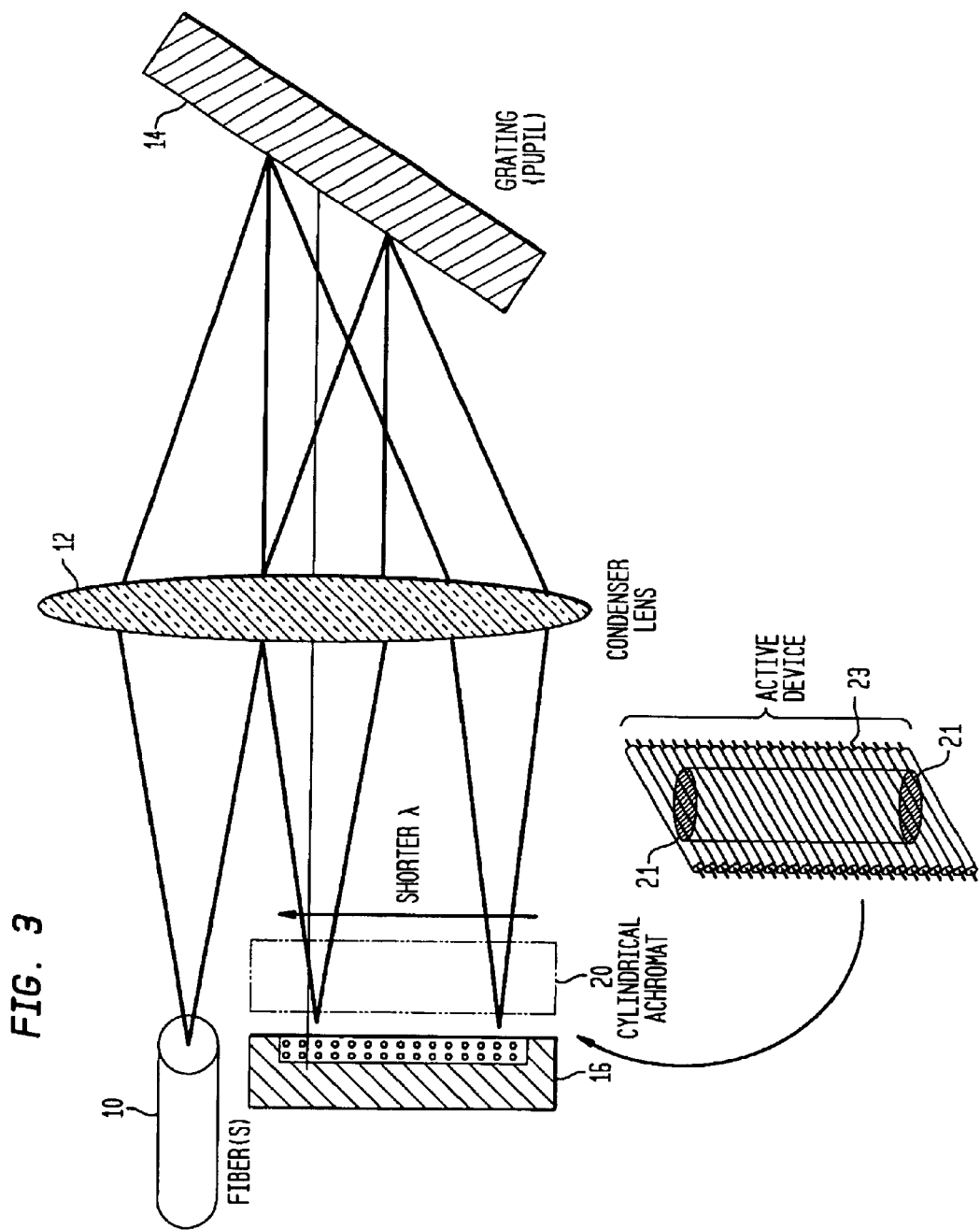
FIG. 3 shows the conversion of the basic architecture shown in FIG. 1 into a strongly anamorphic system by locating a single small cylindrical lens in front of the active device according to one embodiment of the present invention.

FIG. 3 shows the conversion of a system into a strongly anamorphic system by locating a single small cylindrical lens 20 in front of and confocal with the active device 16. In FIG. 3, the active device 16 is one of the active devices of concurrently filed U.S. application Ser. No. 10/207,813 entitled AN ARTICLE INCLUDING AN OPTICAL GAIN EQUALIZER by one of the inventors of the subject application; the contents of which are hereby incorporated by reference in their entirety. The cylindrical lens 20 changes the beam footprint 21 on the active device 16 such that the continuous-spectral-response discrete gain equalizer filter (DGEF) operation is more easily achieved. The active device 16 includes in the illustrated embodiment of FIG. 3 a plurality of reflective mirrors 23 that when moved (e.g., tilted) about the y-axis, cause a portion of the reflected beam to miss the optical fiber 10, thus causing loss and reducing the magnitude of the reflected beam in the fiber 10. By controlling the mirrors 23, the magnitude of the different beams (which represent different wavelengths of the WDM signal) on the active device 16 can be equalized.

The anamorphic optics of the present invention (e.g., cylinder 20 in FIG. 3) improve this operation by modifying the beam relay characteristics of the optics in x-z and y-z planes separately; which enlarges the tilt-loss response while not harming resolution. The anamorphic optics 20 expand the beams along the x-axis but not the y-axis such that the desired spectral resolution is achieved.

As will be appreciated, the inventors have recognized that the use of anamorphic optics decouple first characteristics of the optical system such as spectral resolution, from other characteristics of the beams such as the size along a particular axis or separation between beams. In the case of FIG. 3, decoupling the x-z and y-z manipulations provides for decoupling the characteristics affecting the capability of the active device 16 to produce loss from the characteristics providing resolution. For example, when the mirrors 23 of the active device 16 are tilted, the tilt required for decoupling the reflected beam from the optical fiber to cause loss is dramatically reduced, thus making the chip requirements easier for blocker or DGEF functionality. This applies to continuous spectrum or to channelized functions, where the discrete mirror gaps are respectively not resolved or resolved in the spectral response.

Figure 4A:
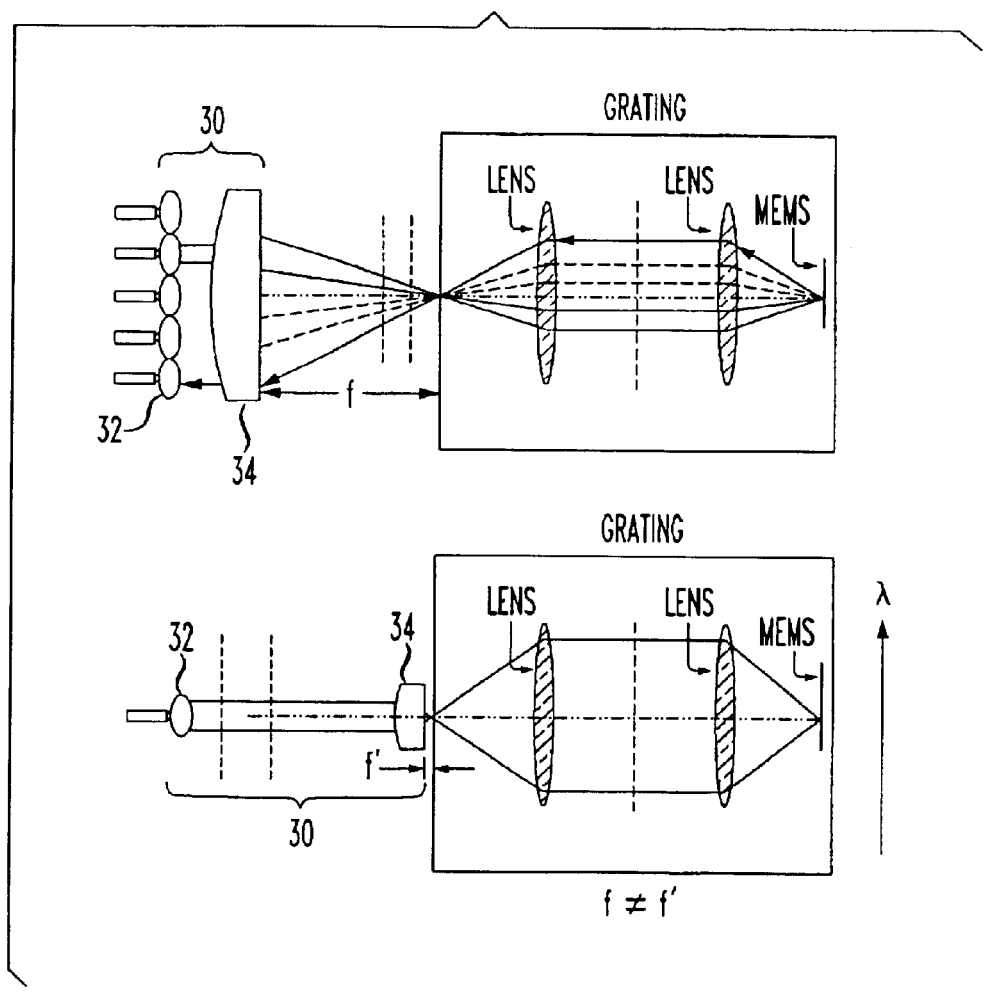
FIGS. 4a and 4b show two possible anamorphic front-end optical systems to condition beams for entry into the demux/mux architecture in such a way that wavelength-selective routing is achieved by a tilt mirror array as the active device according to two embodiments of the present invention.
Figure 4B:
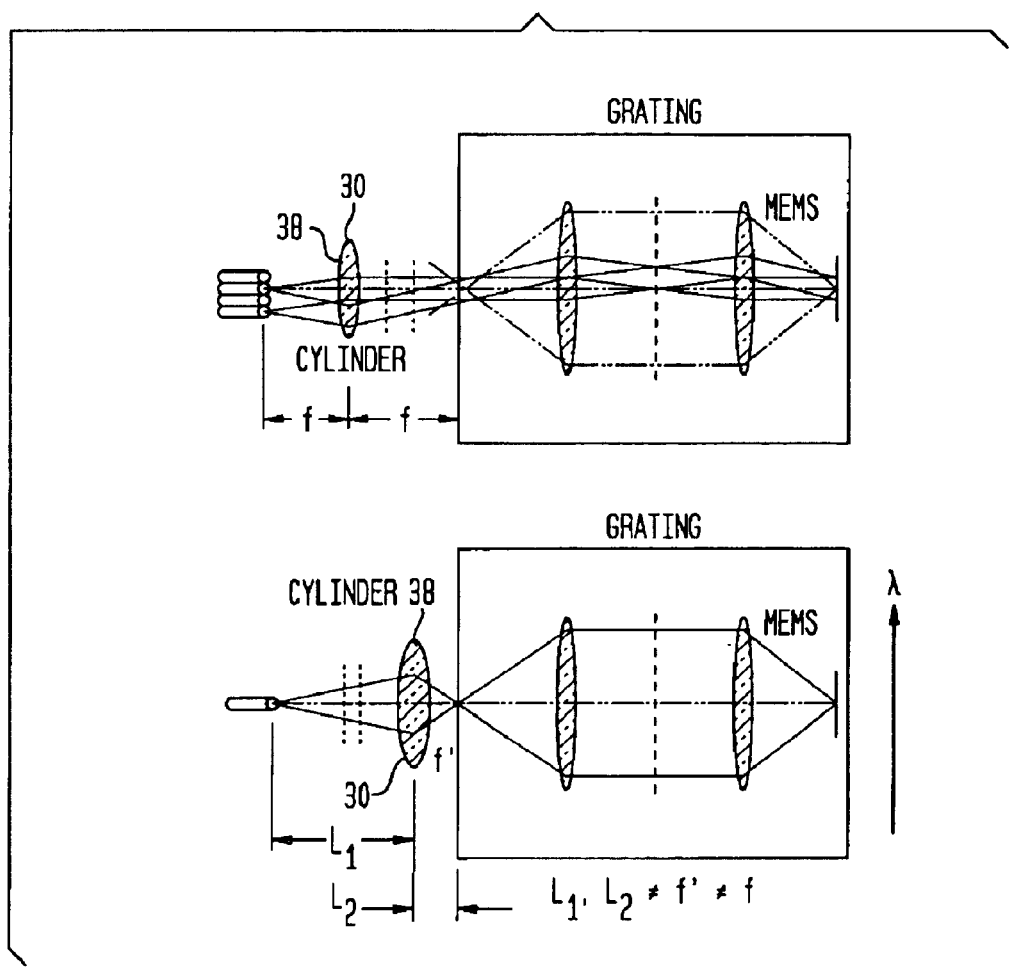

FIGS. 4a and 4b show two possible anamorphic front-end optical systems to condition beams for entry into the demux/mux module in such a way that wavelength-selective routing is achieved by a tilt mirror array as the active device 16. In both cases, anamorphic optics 30 are used to translate the 1-D tilt effect in the non-dispersed (x-z) system into a beam placement change at an alternate fiber port. The beams are narrowed in the direction that has no impact on resolution so that routing to several ports is possible without enlarging the basic demux/mux system. In FIG. 4a the anamorphic optics enhance a multi-axis coupling scheme, while in FIG. 4b they allow a single-axis coupling scheme.

Specifically, the anamorphic optics 30 of FIG. 4a include individual collimating lenslets 32, which may be easily fitted with polarization-diversity capability using a walkoff crystal, and a cylindrical lens 34. Tilting the mirrors of active device 16 switches a beam to one of these collimated beam axes. The anamorphic optics 30 of FIG. 4b allows denser packing of a large port count in a small corrected field by avoiding a lens array and placing two distinct systems into coexistence for the x-z and y-z planes without the need for multi-axis optics. As shown, the anamorphic optics 30 include a cylindrical lens 38. In FIGS. 4a and 4b, f represents the focal length and L represents the physical length.

Figure 5:
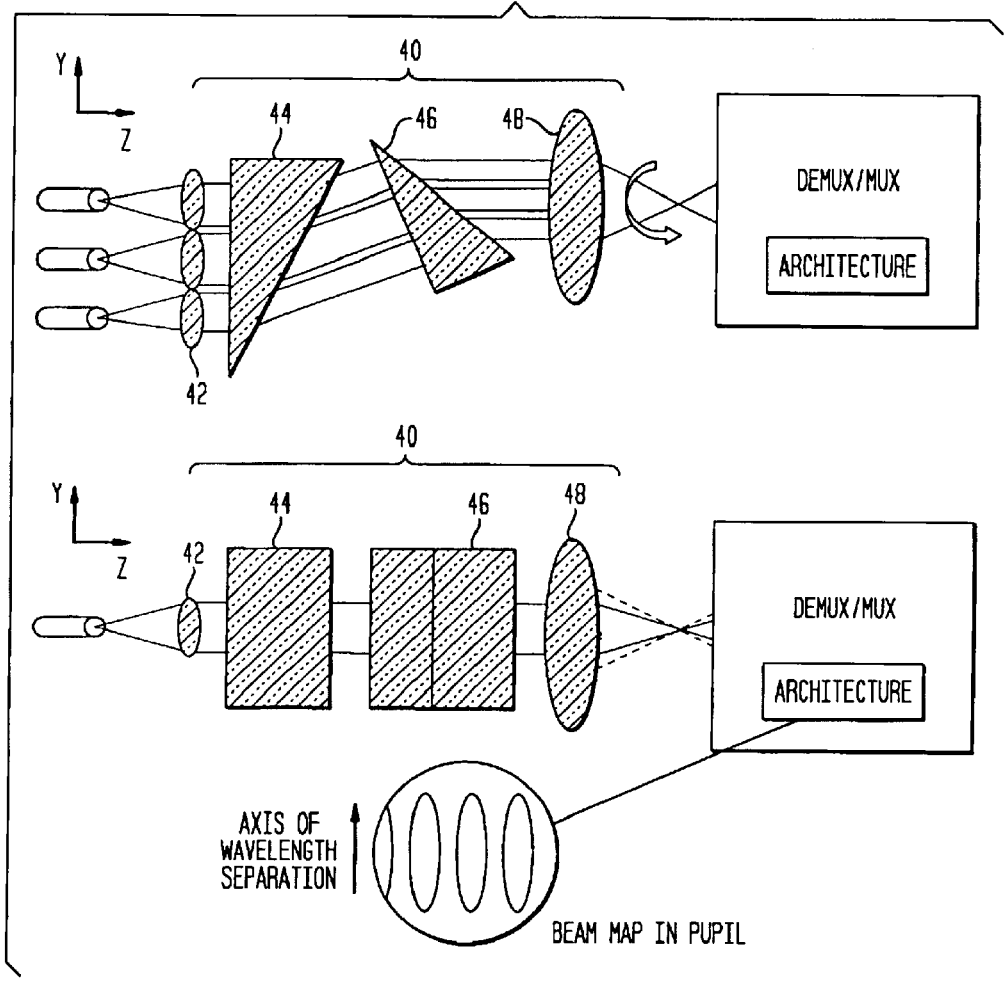
FIG. 5 shows the use of a prism pair as anamorphic elements placed in the front end of the demux/mux architecture to change beam size in only one direction.

FIG. 5 shows the use of a prism pair as anamorphic elements placed in front of the demux/mux architecture. Specifically, the anamorphic optics 40 include a plurality of individual collimating lenslets 42 (one for each optical fiber), a first prism element 44, a second prism element 46 and a condenser lens 48. This anamorphic optical arrangement compresses beams in the routing direction x, so more beams pass through the optics, but resolution is not degraded since the size is not reduced in the y-z system. The prisms play a role similar to front end cylindrical lenses.

While the examples of anamorphic lens systems according to the present invention described above include one or more cylindrical lens or prism elements as the anamorphic element or elements, the present invention is not limited to the anamorphic element or elements being a cylindrical lens or prism. Instead, the present invention encompasses the use of any type of anamorphic optical element.

The invention being thus described, it will be obvious that the same may be varied in many ways. Such variations are not to be regarded as a departure from the spirit and scope of the invention, and all such modifications are intended to be included within the scope of the following claims.

We claim:

1. An optical demultiplexer/multiplexes architecture, comprising:

an anamorphic optical communications system that decouples first characteristics of a beam passing through the anamorphic optical system in a first optical plane from at least second characteristics of the beam in a second optical plane, wherein first characteristics are not impacted by changes to the beam in said second optical plane, and wherein the anamorphic optical system compresses the beam along one desired axis of the anamorphic optical system without impacting resolution.

2. The architecture of claim 1, wherein the first characteristics of the beam provide spectral resolution.

3. The architecture of claim 1, wherein second characteristics or the beam include a size of the beam along a desired axis of the anamorphic lens optical system.

4. The architecture of claim 1, wherein the second characteristics of the beam provide loss.

5. The architecture of claim 1, the anamorphic optical system decouples the first characteristics from the second characteristics by changing a shape of the beam.

6. The architecture of claim 1, wherein the anamorphic optical system includes a single cylindrical lens.

7. The architecture of claim 1, wherein the anamorphic optical system includes more than one cylindrical lens.

8. The architecture of claim 1, wherein the anamorphic optical system comprises one or more beam expansion prisms.

9. The architecture of claim 1, further comprising:

a one dimensional dispersive element separating a beam into a plurality of separated beams, each separated beam associated with a different wavelength;

an active device receiving the separated beams; and wherein the anamorphic optical system is disposed between the one dimensional dispersive element and the active device.

10. The architecture of claim 9 wherein the active device is for selectively changing the magnitude of the separated beams.

11. The architecture of claim 1 further comprising:

a one dimensional dispersive element separating a the beam into a plurality of separated beams, each separated beam associated with a different wavelength;

an active device receiving the separated beams; and wherein the anamorphic optical system is disposed before the one dimensional dispersive element.

12. The architecture of claim 11, wherein the active device is for changing a spatial position of the separated beams.

13. The architecture of claim 11, wherein the anamorphic optical system includes at least one prism.

14. An optical demultiplexer/multiplexer architecture, comprising:

an anamorphic optical communications system that causes characteristics of a beam passing through the anamorphic optical system providing spectral resolution to become independent of at least other characteristics of the beam, wherein the anamorphic optical system compresses the beam along one desired axis of the anamorphic optical system without impacting resolution.

* * * * *